(12) United States Patent
Ling et al.

(10) Patent No.: US 8,125,964 B2
(45) Date of Patent: Feb. 28, 2012

(54) FRAMEWORK FOR HYBRID AD-HOC NETWORKS

(75) Inventors: Yibei Ling, Belle Mead, NJ (US); Wai Chen, Parsippany, NJ (US); Paul Li-Ching Yu, Silver Spring, MD (US)

(73) Assignee: Telcordia Licensing Company, LLC, Piscataway, NJ (US)

( * ) Notice: Subject to any disclaimer, the term of this patent is extended or adjusted under 35 U.S.C. 154(b) by 1242 days.

(21) Appl. No.: 11/282,509

(22) Filed: Nov. 18, 2005

(65) Prior Publication Data

US 2007/0115895 A1 May 24, 2007

(51) Int. Cl.
*H04W 4/00* (2009.01)
(52) U.S. Cl. ........ 370/338; 370/310; 370/314; 370/389; 370/400; 370/472; 455/343.1; 455/343.4; 455/41.2
(58) Field of Classification Search ............... 455/422.1, 455/424, 428, 343.1, 343.4, 41.2, 517, 521; 370/338, 328, 342, 311, 318, 336, 400, 470, 370/472, 310, 314, 389
See application file for complete search history.

(56) References Cited

U.S. PATENT DOCUMENTS

| | | | |
|---|---|---|---|
| 6,002,918 A * | 12/1999 | Heiman et al. | 340/7.38 |
| 6,928,475 B2 * | 8/2005 | Schenkel et al. | 709/224 |
| 7,474,887 B2 * | 1/2009 | Chandra et al. | 455/343.2 |
| 2004/0105401 A1 * | 6/2004 | Lee | 370/311 |
| 2004/0208152 A1 * | 10/2004 | Perkins et al. | 370/338 |
| 2004/0219909 A1 * | 11/2004 | Kennedy et al. | 455/422.1 |
| 2004/0253996 A1 * | 12/2004 | Chen et al. | 455/574 |
| 2005/0164712 A1 | 7/2005 | Kennedy, Jr. et al. | |
| 2005/0188062 A1 * | 8/2005 | Li et al. | 709/220 |
| 2006/0007863 A1 * | 1/2006 | Naghian | 370/238 |
| 2006/0023689 A1 * | 2/2006 | Allen et al. | 370/342 |
| 2006/0128349 A1 * | 6/2006 | Yoon | 455/343.2 |
| 2006/0209715 A1 * | 9/2006 | Kushalnagar et al. | 370/254 |
| 2007/0014189 A1 * | 1/2007 | Basilico | 367/128 |
| 2007/0046530 A1 * | 3/2007 | Fedora | 342/357.01 |
| 2007/0053315 A1 * | 3/2007 | Sugaya | 370/318 |
| 2009/0011834 A1 * | 1/2009 | Chhabra | 463/42 |

FOREIGN PATENT DOCUMENTS

| | | |
|---|---|---|
| WO | WO-02/03091 | 1/2002 |
| WO | WO-03/098815 | 11/2003 |
| WO | WO-2004/084022 | 9/2004 |

OTHER PUBLICATIONS

FleetNet—Internet on the Road, "Ad Hoc Radio Network for Inter-Vehicle Communications",DaimlerChrysler AG, Fleetnet: www.fleetnet.de, Jan. 2002.

Morsink P.L.J. et al, "Preliminary Design of an Application for Communication Based Longitudinal Control in the CarTalk2000 Project", (Continued)

*Primary Examiner* — Ajit Patel
*Assistant Examiner* — Khai M Nguyen

(57) ABSTRACT

A hybrid mobile ad-hoc network and a method of operating the same, including a mobile network node and a plurality of static network nodes randomly distributed over a coverage area with a predetermined density. The static network nodes form a static infrastructure backbone of the hybrid mobile ad-hoc network. Position information of the static network nodes, either through position awareness or triangulation with reference to other static nodes enhances the network function. The method tracks mobile node position with a minimum of overhead because of the fixed infrastructure of static nodes. The infrastructure can self-heal by placing excess static nodes in a hibernating state, and activating those in response to the failure of a nearby static node.

24 Claims, 2 Drawing Sheets

DEPLOYMENT AREA

OTHER PUBLICATIONS

CarTalk, Information Society Technologies, pp. 1-13, Oct. 30, 2003.
C. Cseh et al, "Communication Architecture", CarTALK 2000 Consortium, Oct. 28, 2002, pp. 1-145.
International Search Report, dated Jul. 30, 2008 (2 pages).
Search Report on European Application 06851760.6, mailed Mar. 22, 2011.

* cited by examiner

FRAMEWORK FOR HYBRID AD-HOC NETWORKS

STATEMENT REGARDING FEDERALLY SPONSORED NETWORKS

The U.S. Government has a paid-up license in this invention and the right in limited circumstances to require the patent owner to license others on reasonable terms as provided for by the terms of Cooperative Agreement DAAD19-01-2-0011 with the U.S. Army Research Laboratory under the Collaborative Technology Alliance Program.

BACKGROUND OF THE INVENTION

1. Field of Invention

The present invention relates to the field of telecommunication, and more particularly to the field of hybrid mobile ad-hoc networks.

2. Description of Related Art

Mobile Ad-hoc Networks (MANETs) are highly desirable to facilitate communication and message passing among mobile network nodes, for example those installed in vehicles and the like. Dynamically changing network topology due to node mobility and the resulting lack of a fixed network infrastructure make maintaining end-to-end connectivity in such networks a notoriously difficult problem despite tremendous effort.

A variety of routing protocols have been proposed, among them Optimized Link State Routing (OLSR), Destination Sequenced Distance Vector (DSDV), Ad-hoc On-demand Distance Vector (AODV), Dynamic Source Routing (DSR), and GPS-based routing protocols.

Each of OLSR, DSDV, AODV, and DSR requires nodes to maintain information about network topology. However, the dynamically and rapidly-changing nature of mobile network topology requires a flood of control messages among the nodes to maintain updated position information. Network bandwidth is quickly overwhelmed. As a result, such network protocols are inherently unscaleable.

GPS-based routing protocols tend not to require global topology information. However, mobile nodes make routing decisions based upon knowledge of neighboring nodes, i.e. nodes within a one-hop distance with respect to transmission range. However, maintaining such knowledge would be extremely expensive in terms of network and computational resources in highly mobile environments.

Fundamentally, previously proposed solutions do not use enough of the available information to optimize routing and network management decisions. Therefore, a mobile ad-hoc network capable of maintaining end-to-end communication with limited overhead would be desirable in the art.

BRIEF SUMMARY OF THE INVENTION

It is an object of the present invention to provide a hybrid MANET which adapts well to dynamically changing mobile ad-hoc network environments and provides location-aware capability for resource-aware information dissemination. This is achieved by exploiting the existence of a subset of static nodes having a fixed, and more preferably known, position, thereby facilitating communication among the mobile nodes.

It is a further object of the present invention to provide a hybrid MANET consisting of two types of network nodes: static network nodes and mobile network nodes. The static network nodes serve as an infrastructure backbone of the MANET. Mobile network nodes utilize the static network nodes to exchange information and to support a variety of location-aware applications.

Therefore, according to the present invention, a hybrid mobile ad-hoc network includes a mobile network node and a plurality of static network nodes randomly distributed over a coverage area with a predetermined density. The static network nodes form a static infrastructure backbone of the hybrid mobile ad-hoc network. Preferably, at least two of the static network nodes are position-aware, with any position-ignorant static network nodes being located by triangulation from the position-aware static network nodes.

Also provided according to the present invention is a method of operating a hybrid mobile ad-hoc network including a mobile network node, the method comprising randomly deploying a plurality of static network nodes over a coverage area in a predetermined density, determining the pair-wise network connectivity among the static network nodes in order to determine the network topography of an infrastructure backbone made up of the static network nodes, and communicating the infrastructure backbone topography information throughout the network. The method preferably further includes coordinating transmissions among neighboring static network nodes. In preferred embodiments, the method of the present invention utilizes the updated network topography information in making routing decisions.

Preferably, at least two static network nodes are position-aware, the method further comprising determining the location of the position-aware static network nodes and any neighboring position-ignorant static network nodes, and including the location of the position-aware static network nodes in the network backbone topography information. Determining the relative position of neighboring static network nodes, can be accomplished by triangulation through ranging or directional position.

In a preferred embodiment of the method, each static network node transmits a beacon at a periodic interval to advise other nodes of its existence, the periodic interval is an adjustable network parameter. Each mobile network node can respond to the beacon with a reply comprising information about the location of the mobile network node, including bearing information about the mobile network node. The reported location of each mobile network node can be communicated throughout the network.

The static network nodes can be capable of operating in an active state and a hibernating state, entering the hibernating stated if it is determined that one or more of (a) a local static network node density exceeds a predetermined threshold, or (b) distance from another operating static network node is beneath a predetermined threshold. Any static network node operating in the hibernating state responds to the absence of an expected beacon from the nearest static network node in the active state by entering the active state.

BRIEF DESCRIPTION OF THE DRAWINGS

These and other features, benefits and advantages of the present invention will be made apparent with reference to the following specification and accompanying drawing, in which like reference numerals indicate like features across the several views, and wherein.

DETAILED DESCRIPTION OF THE INVENTION

Figure 1:
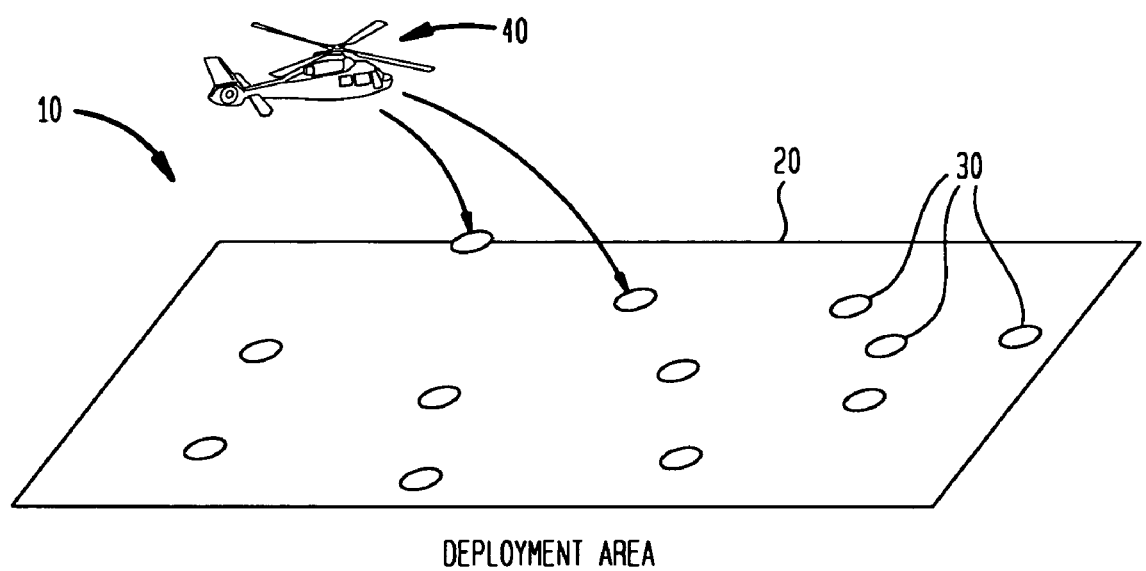
FIG. 1 illustrates aerial static node distribution in a hybrid MANET according to an exemplary embodiment of the present invention.

In order to maintain end-to-end connectivity in a MANET, according to the present invention a hybrid MANET includes a plurality of static network nodes and preferably one or more mobile network nodes. Referring now to FIG. 1, shown is a hybrid MANET, generally 10, according to an exemplary embodiment of the present invention. A particular region or deployment area 20 is defined to be serviced and covered by the hybrid MANET 10. A plurality of static network nodes 30 are populated in the deployment area 20.

The static network nodes 30 may be randomly located, and may be deployed by aerial drop, for example from a helicopter 40 or fixed wing aircraft. The density of static network nodes 30, i.e., static network nodes per unit area, in the deployment area 20 may vary, taking into consideration the transmission range of static network nodes 30, that of mobile network nodes 50 (See FIG. 2), the terrain of the deployment area 20, and/or the system requirements and motion speed of the mobile network nodes 50. Alternately or additionally, static nodes may be deployed from ground-based vehicles, including being deployed from vehicles carrying mobile network nodes 50. In this way the hybrid MANET 10 can adapt to conditions developing after initial deployment and setup, including for example unanticipated expansion of the deployment area 20, or to improve connectivity and network performance.

Figure 2:
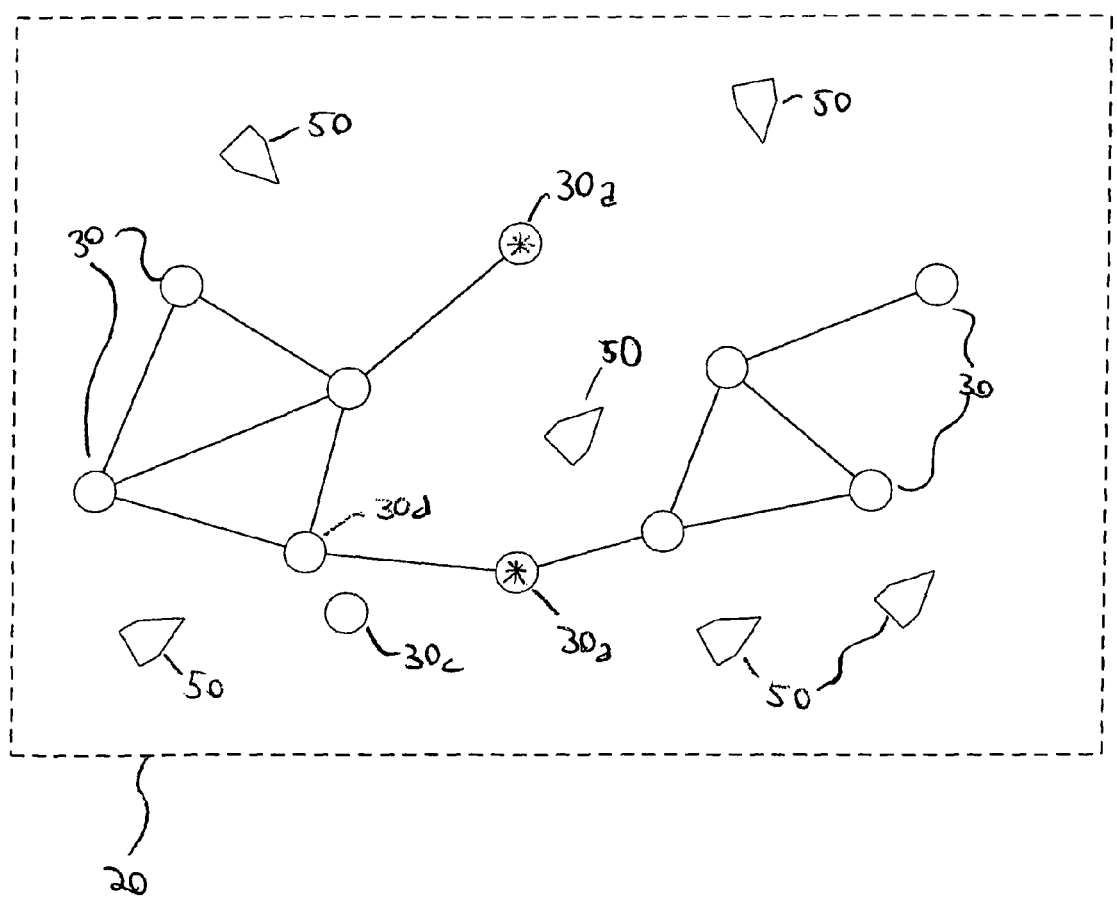
FIG. 2 illustrates a schematic plan view of a hybrid MANET according to an exemplary embodiment of the present invention.

Once deployed, the static network nodes 30 initialize the hybrid MANET 10 to form a network infrastructure backbone. Referring now to FIG. 2, illustrated is a schematic plan view of a hybrid MANET 10 according to an exemplary embodiment of the present invention. Initialization includes determining the pair-wise network connectivity among these static network nodes 30 to define network infrastructure backbone topography.

However, the performance of the hybrid MANET 10 is enhanced by knowledge of the position of each static node 30. At least a subset of static network nodes 30 are position-aware static network nodes 30a, which are capable of determining their position, for example by capability to receive GPS signals. Other forms of position determining capability are known in the art, for example by reference to known terrestrial radio beacons, or by inertial tracking, and may be used in place of or in addition to GPS. Once the location of a position-aware static node 30a has been established, the GPS or other position-locating means may be deactivated to conserve power in the position-aware static node 30a.

Once the position of a plurality of position-aware static network nodes 30a have been ascertained, any position-ignorant static network nodes 30b may be located by triangulation. Although described with reference to position-aware static network nodes 30a, the relative position information among the static network nodes 30 is useful even in the absence of location information determined by position-aware static network nodes 30a. Therefore, locating any or all static network nodes 30 is not a prerequisite to triangulation among the static network nodes 30.

Triangulation can be accomplished by approximating the range between static nodes 30 by reference to transmission power of messages received, and/or the timing of messages and response with respect to a network time slot allocation, described infra. Ranging triangulation between two position-aware static network nodes 30a can uniquely locate position-ignorant static network node 30b only at the mutual extent of transmission range with respect to each position-aware static network node 30a. More likely, the intersection of radii with respect to two position-aware static network nodes 30a presents two potential locations. Ranging with respect to a third position-aware static network node 30a can uniquely locate the position-ignorant static network node 30b.

Alternatively, the position-aware network nodes 30a, and optionally all static network nodes 30, can have a directional antenna capable of determining the azimuth of a received message. In this case, only two such position-aware static network nodes 30a are required to uniquely locate a position-ignorant static network node 30b. However, the directional antenna structure and associated direction decoding circuitry adds complexity, cost and weight to the static node 30, and is less preferred.

In any case, where static network nodes 30 are randomly distributed, it cannot be assured that two or three position aware static network nodes 30a as necessary are within the transmission range of a position-ignorant static network node 30b. Therefore, in the preferred embodiments, all static network nodes 30 are position-aware static network nodes 30a.

According to the preferred embodiment, the now known and fixed position of static network nodes 30 determines the backbone topography of the hybrid MANET 10. Backbone topography information may be stored and communicated throughout the network. Whether any static network nodes 30 are position-aware or not, overhead of establishing backbone topography need only occur once, and thereafter need not occupy bandwidth or computation resources with position updates.

According to a further embodiment of the present invention, initialization of the hybrid MANET 10 includes coordination of transmissions among static network nodes 30. Static network nodes 30 within transmission range of one another will negotiate or allocate time slots within a periodic cycle. Each static network node 30 will transmit its messages only during its designated time slot. Accordingly, the possibility of message collision is reduced, and network throughput along the infrastructure backbone is improved and increased. This transmission allocation schedule can include one or more unassigned allocations for a mobile node 50 to use as it passes in or out of transmission range of a static node 30.

With the hybrid MANET 10 backbone infrastructure established, each static node 30 broadcasts a beacon advising of its existence at some periodic interval. The interval is an adjustable network parameter, and can be responsive to the speed of mobile nodes in the network, to granularity (i.e., desired positional accuracy), or to desired responsiveness of the network. Upon receipt of such a beacon, mobile network nodes 50 reply with acknowledgment messages, including position information of the mobile node 50, and preferably bearing information, more preferably at least speed and direction. The position information contained in the acknowledgement message is stored and disseminated across the infrastructure network.

The present invention creates certain advantages over a conventional MANET. First, the static backbone topography of the hybrid MANET 10 assists in maintaining end-to-end network connectivity. Additionally, the mobile network nodes 50 are relieved from passing messages regarding the position of other nodes in the network, and from maintaining complete awareness of all or even nearby mobile network nodes 50 in the network. Similarly, the mobile network nodes 50 can easily and cheaply maintain knowledge of the network backbone.

According to a preferred embodiment of the present invention, the position of each static node is known. Position information can provide location-aware and direction-aware routing capability to the mobile nodes. For example, the availability of location information about the static network nodes 30 can be used to anticipate the future location of mobile network nodes 50 by deriving bearing information about the mobile network node 50 from the location of static nodes 30 receiving sequential messages from given mobile nodes 50. Alternately or additionally, even in the absence of position information regarding the static nodes 30, the mobile network nodes 50 may provide bearing information in response to static network node 30 beacons. This, in turn, improves the efficiency and accuracy of message routing by predicting mobile node location without additional location information, for example by requesting a position query of the mobile network node 50, which would consume additional network bandwidth.

Further, knowledge of the position of static network nodes 30 allows direction-aware routing, i.e., passing a message in a different direction from which it came, rather than back in that same direction, to more efficiently propagate messages throughout the network. A received message header will preferably include information regarding the nodes through which it passed in addition to a destination. By reference to a known backbone topography, a static node could deduce that a received message is destined in a different direction, and then not repeat that message, conserving bandwidth and improving overall network performance. Similarly, the known position of static network nodes 30 comprising the hybrid MANET backbone permits intelligent geographic forwarding among mobile network nodes 50.

Additionally, the hybrid MANET 10 according to the present invention has the ability to self-heal in response to the failure of a static node. Where static network nodes 30 are placed randomly, two or more static network nodes 30 may be so close to one another as to not appreciably add to network function. In such a case, a superfluous static node 30c may enter a hibernating state, in order to conserve power. In a hibernating state the static node 30 would receive messages, but not transmit or pass messages.

Each static network node 30 is aware of its neighboring static network nodes 30 by receiving the periodic beacon emitted by a static network node 30 within a one-hop proximity (i.e., within broadcast range of the static network node 30). A predetermined threshold of local static network node density can be used to determine if an area is overcrowded. Alternately, if the position of each static network node is known, location proximity can be the determining threshold for overcrowding. If the number of received beacons exceeds the predetermined threshold, then the superfluous static network node 30c would enter a hibernating state. This determination typically takes place during the initialization of the hybrid MANET 10 infrastructure backbone.

The absence of the expected periodic beacon from the static node 30d closest to the hibernating superfluous static node 30c can be interpreted as failure of the closest static node 30d. In response, the superfluous static node 30c would transition from hibernating state to active state, and would begin to function as part of the hybrid MANET 10. In this manner, the hybrid MANET 10 can self-heal from the failure of a static node 30d.

The present invention has been described herein with reference to certain exemplary embodiments. Certain modifications and alterations may be apparent to those skilled in the art without departing from the scope of the present invention. The exemplary embodiments are meant to be illustrative, and not limiting, on the scope of the present invention, which is defined solely with reference to the appended claims.

The invention claimed is:

1. A network comprising:
a first static node configured to periodically transmit at least one beacon while the first static node is in an active state; and
a second static node configured to be in communication with the first static node, wherein the first static node and the second static node are a substantially same type of network node configured to communicate with a mobile network node, wherein the second static node is configured to periodically receive the at least one beacon from the first static node while the second static node is in an inactive state, and wherein the second static node is further configured to transition from the inactive state to the active state if an expected beacon of the at least one beacon is not received from the first static node.

2. The network of claim 1, further comprising a mobile node in communication with the first static node.

3. The network of claim 2, wherein the mobile node is configured to transmit an acknowledgement message to the first static node in response to the at least one beacon, and wherein the first static node is configured to determine a position of the second static node based at least in part on the acknowledgement message.

4. The network of claim 1, wherein the first static node and the second static node are randomly distributed within a coverage area.

5. The network of claim 4, wherein at least the first static node and the second static node are randomly distributed within the coverage area such that a predetermined density is satisfied.

6. The network of claim 5, wherein the predetermined density is based on one or more of a transmission range of the first static node, a transmission range of a mobile node associated with the network, a speed of the mobile node associated with the network, or a terrain of the coverage area.

7. The network of claim 1, wherein the first static node is configured to determine a position of the first static node using one or more of a global positioning system, terrestrial radio beacons, or inertial tracking.

8. The network of claim 1, wherein the first static node includes a directional reception antenna, and is configured to determine an azimuth of a received signal.

9. The network of claim 1, wherein the second static node is configured to transition to the inactive state if a density of static nodes in a coverage area exceeds a predetermined threshold.

10. The network of claim 1, wherein the second static node is configured to transition to the inactive state if a distance between the second static node and the first static node is less than a predetermined threshold.

11. The network of claim 1, wherein the first static node and the second static node are deployed by an aerial vehicle or a ground vehicle.

12. The network of claim 1, wherein the network comprises a hybrid mobile ad-hoc network, and wherein the first static node and the second static node form at least a portion of a static infrastructure backbone of the hybrid mobile ad-hoc network.

13. A method comprising:
receiving, from a first static node in a hybrid mobile ad-hoc network, a first beacon at a second static node while the first static node is in an active state and the second static node is in an inactive state, wherein the first static node and the second static node are a substantially same type of network node configured to communicate with a mobile network node,;

determining whether a second beacon is received from the first static node within a predetermined amount of time after receipt of the first beacon; and transitioning the second static node from the inactive state into the active state in response to the second beacon not being received within the predetermined amount of time.

14. The method of claim 13, further comprising:

determining a pair-wise connectivity among a plurality of static nodes in the network, wherein the plurality of static nodes include the first static node and the second static node;

determining a network topography based at least in part on the pair-wise connectivity; and distributing the network topography throughout the network.

15. The method of claim 13, further comprising randomly deploying the first static node and the second static node in a coverage area such that a predetermined density is satisfied.

16. The method of claim 13, further comprising transitioning the second static node from the active state into the inactive state if a density of static nodes in a coverage area exceeds a predetermined threshold.

17. The method of claim 13, further comprising:

receiving, at the first static node, an acknowledgement message from a mobile node in response to the first beacon; and determining a position of the second static node based at least in part on the acknowledgement message.

18. The method of claim 13, further comprising transitioning the second static node from the active state into the inactive state if a distance between the second static node and the first static node is less than a predetermined threshold.

19. A static node in a hybrid mobile ad-hoc network, wherein the static node is configured to:

receive, from another static node in a hybrid mobile ad-hoc network, a first beacon while the another static node is in an active state and the static node is in a inactive state, wherein the static node and the another static node are a substantially same type of network node configured to communicate with a mobile network node;

determine whether a second beacon is received from the another static node within a predetermined amount of time after receipt of the first beacon; and transition from the inactive state to the active state in response to the second beacon not being received within the predetermined amount of time.

20. The static node of claim 19, wherein the static node and the second static node are randomly positioned within a coverage area such that a predetermined density is satisfied.

21. The static node of claim 20, wherein the predetermined density is based on a transmission range of the static node.

22. The static node of claim 19, wherein the static node is further configured to transition from the active state to the inactive state if a density of static nodes in a coverage area exceeds a predetermined threshold.

23. The static node of claim 19, wherein the static node is deployed by an aerial vehicle.

24. The static node of claim 19, wherein the static node is configured to determine a position of the static node using one or more of a global positioning system, terrestrial radio beacons, or inertial tracking.

* * * * *

UNITED STATES PATENT AND TRADEMARK OFFICE
CERTIFICATE OF CORRECTION

| | | |
|---|---|---|
| PATENT NO. | : 8,125,964 B2 | Page 1 of 1 |
| APPLICATION NO. | : 11/282509 | |
| DATED | : February 28, 2012 | |
| INVENTOR(S) | : Ling et al. | |

It is certified that error appears in the above-identified patent and that said Letters Patent is hereby corrected as shown below:

Column 7, line 3, in Claim 13, delete "node,;" and insert -- node; --.

Column 8, line 7, in Claim 19, delete "a inactive state," and insert -- an inactive state, --.

Column 8, line 18, in Claim 20, delete "the second static node" and insert -- the another static node --.

Signed and Sealed this
Fourth Day of September, 2012

David J. Kappos
*Director of the United States Patent and Trademark Office*